W. F. L. BETH.
AIR FILTER.
APPLICATION FILED MAR. 9, 1921.

1,390,966.

Patented Sept. 13, 1921.

Inventor
Wilhelm F. L. Beth
by
Attorney

UNITED STATES PATENT OFFICE.

WILHELM FRIEDRICH LUDWIG BETH, OF LÜBECK, GERMANY.

AIR-FILTER.

1,390,966.      Specification of Letters Patent.      Patented Sept. 13, 1921.

Application filed March 9, 1921. Serial No. 451,039.

*To all whom it may concern:*

Be it known that I, WILHELM FRIEDRICH LUDWIG BETH, manufacturer, residing at Lübeck, Germany, have invented certain new and useful Improvements in Air-Filters, (for which I have filed applications in Germany, Jan. 3, 1920; Switzerland, Dec. 24, 1920; and Belgium, Dec. 29, 1920,) of which the following is a specification.

My invention relates to improvements in air filters, such as are used for cleaning air or gas from dust and other impurities. More particularly my invention relates to improvements in that type of filters in which the filtering surface is provided by tubular members the walls of which are traversed by the current of air or gas in an outward direction and in which the dust is deposited on the inner wall of the filtering elements from which it is removed from time to time by folding, shaking or beating, or by means of a counter-current. In apparatus of this type the tubular members must be open at their bottom ends, in order that the dust deposited on the inner walls may fall downward and out of the filtering elements and into a chamber provided below the same. My invention relates more particularly to the means for connecting the tubular filtering elements with the horizontal partition provided between the filtering chamber and the chamber for collecting the dust, and the object of the improvements is to provide a tight joint between the tubular members which permits the said members to be readily mounted and dismounted without injuring the same. With this object in view my invention consists in the matters to be described hereinafter and particularly pointed out in the appended claims, reference being had to the accompanying drawing and to the letters of reference marked thereon. In the drawing a preferred embodiment of the invention is shown.

Figure 1:
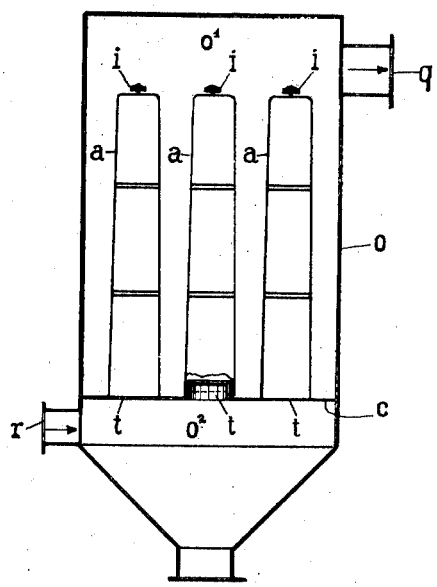
Figure 1, is a vertical section of the filtering apparatus.
Figure 2:
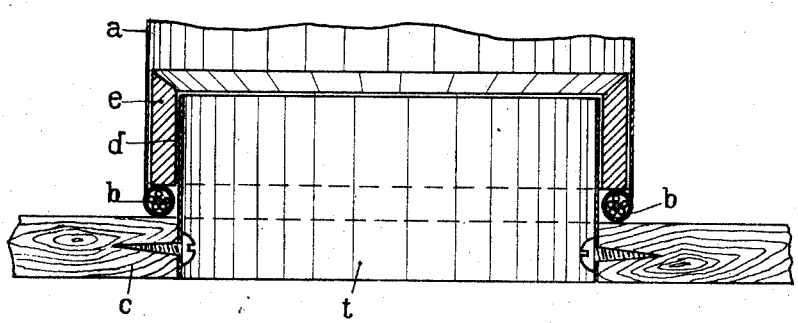
Fig. 2, is a vertical section of the improved joint.

In the example shown in the figures, the filtering apparatus consists of a box or casing $o$ divided by a horizontal partition $c$ into an upper chamber $o^1$ and a lower chamber $o^2$. The upper chamber has an air outlet $q$ and the lower chamber an air inlet $r$. Within the upper chamber $o^1$ there are horizontal bars $i$ from which a suitable number of tubular filtering elements $a$ are suspended which elements cover with their open bottom ends holes $t$ made in the partition $c$.

As shown each of the filtering elements is formed at its bottom end with an internal bead $b$ preferably provided by an elastic filling medium such as a hempen rope, a ring of rubber, or the like, and the said bead is placed over a short tubular member $d$ secured to the hole $t$. Between the wall of the filtering element $a$, the tubular member $d$, and the bead $b$ an annular chamber is provided, and within the said chamber there is a weighted body such as a ring $e$ which is freely movable within the chamber and bears on the bead $b$ so as to press the same on the bottom $c$ and to provide a tight joint.

I claim:

1. A filtering device comprising a support provided with an aperture, a flange surrounding said aperture, a filtering element having an inturned elastic flange telescopically engaging the first named flange and an annular weight carried within said filtering element by said elastic flange adapted to seat said elastic flange against said first named flange and said support.

2. A joint for tubular filtering members, comprising an upright tubular member, a tightening portion concentric thereof, an upright filtering element having one end concentric of the tubular portion and formed with a flange portion at the side of said tubular member and in position for engagement with said tightening portion, and a weighted annular flange loosely located between said filtering element and tubular member and on the flange portion and tending to press the flange portion in tightening engagement with said tightening portion.

3. A filtering apparatus comprising a casing having a substantially horizontal foraminated partition wall, tubular members on said partition wall and projecting upward from the holes thereof, upright tubular filtering elements within the upper chamber of the casing open at their bottom ends and surrounding with their lower ends each one of said tubular members and formed at their bottom ends with inner flange portions engaging the tubular members and in position for engagement with the partition, and annular weighted bodies between the tubular members and filtering elements and bearing on the flange portions for pressing the same in tightening contact with the partition.

In testimony whereof I have affixed my signature in presence of two witnesses.

WILHELM FRIEDRICH LUDWIG BETH.

Witnesses:
　EDWARD WOLFEM STRAUS,
　WILHELM OTTO.